United States Patent [19]

Comeaux et al.

[11] Patent Number: 5,432,652
[45] Date of Patent: Jul. 11, 1995

[54] SERVO AND DATA FORMAT FOR MAGNETIC TAPE HAVING PLURAL SPACED-APART SERVO AREAS INTERLEAVED WITH DATA TRACK AREAS HAVING SERPENTINE TRACK SCANNING USING ANY ONE OF A PLURALITY OF NUMBER OF CONCURRENTLY ACCESSED TRACKS

[75] Inventors: Wayne T. Comeaux; David C. Graves, both of Tucson, Ariz.; Douglas W. Johnson, Rochester, Minn.

[73] Assignee: International Business Machines Corporation, Armonk, N.Y.

[21] Appl. No.: 75,625

[22] Filed: Jun. 14, 1993

[51] Int. Cl.$^6$ .................................. G11B 5/584
[52] U.S. Cl. .................. 360/77.12; 360/134; 360/48; 360/60
[58] Field of Search ............... 360/77.12, 77.11, 78.01, 360/78.02, 134, 60, 48

[56] References Cited

U.S. PATENT DOCUMENTS

| | | | |
|---|---|---|---|
| 4,048,660 | 9/1977 | Dennison et al. | 360/77.08 |
| 4,224,643 | 9/1980 | Nakano et al. | 360/70 |
| 4,392,163 | 7/1983 | Rijckaert et al. | 360/76 |
| 4,409,628 | 10/1983 | Frimet et al. | 360/73.09 |
| 4,472,750 | 9/1984 | Klumpp et al. | 360/78.01 |
| 4,558,380 | 12/1985 | Porter | 360/53 |
| 4,639,796 | 1/1987 | Solhjell | 360/77.12 |
| 4,677,505 | 6/1987 | Nukada et al. | 360/77.12 |
| 4,719,397 | 1/1988 | Kneifel, II et al. | 318/567 |
| 4,720,754 | 1/1988 | Mizoshita et al. | 360/77.02 |
| 4,727,438 | 2/1988 | Juso et al. | |
| 4,760,475 | 7/1988 | Wong et al. | 360/77.13 |
| 4,977,472 | 12/1990 | Volz et al. | 360/78.14 |
| 4,979,051 | 12/1990 | Eggebeen | 360/21 |
| 5,008,765 | 4/1991 | Youngquist | 360/77.12 |
| 5,055,951 | 10/1991 | Behr | 360/120 |
| 5,121,270 | 6/1992 | Alcudia et al. | 360/77.01 |
| 5,161,299 | 11/1992 | Denison et al. | 29/603 |
| 5,196,969 | 3/1993 | Iwamatsu et al. | 360/75 |
| 5,229,895 | 7/1993 | Schwarz et al. | 360/77.12 |
| 5,262,908 | 11/1993 | Iwamatsu et al. | 360/77.12 |

FOREIGN PATENT DOCUMENTS

| | | |
|---|---|---|
| 0155817 | 9/1985 | European Pat. Off. |
| 529930 | 3/1993 | European Pat. Off. |
| 4216896 | 11/1992 | Germany |

OTHER PUBLICATIONS

IBM Technical Disclosure Bulletin, vol. 20, No. 7, Dec. 1977, p. 2820.

Primary Examiner—Aristotelis Psitos
Assistant Examiner—James T. Wilson
Attorney, Agent, or Firm—H. F. Somermeyer

[57] ABSTRACT

A magnetic tape has three evenly spaced-apart longitudinally-extending servo track areas. Four equal-sized longitudinally-extending data track areas are disposed between said servo track areas and between longitudinal edges of the tape and one of said longitudinally-extending data track areas. For track following, all servo track areas are simultaneously sensed for producing one head positioning signal. Data tracks are arranged into four groups of tracks, one-half of the data tracks in each group are concurrently accessed. The data tracks on the tape are arranged in clusters. Each cluster has one track from each of the groups of tracks. Two laterally-adjacent track clusters constitute four data track wraps for serpentine scanning of data tracks. The concurrent track accessing respectively occurs in first and second halves of a data track wrap (there is a number of wraps equal to one half the number of track clusters). Each servo area indicates two lateral positions of the tape to the head. The lateral spacing between the lateral positions is equal to about a data track width. This arrangement makes the servo areas field writable. The magnetic head has a number of data write and read gaps equal to the number of clusters. A set of four servo gaps are interposed between four groups of write and read gaps and positioned to simultaneously sense all three servo track areas.

18 Claims, 7 Drawing Sheets

SERVO AND DATA FORMAT FOR MAGNETIC TAPE HAVING PLURAL SPACED-APART SERVO AREAS INTERLEAVED WITH DATA TRACK AREAS HAVING SERPENTINE TRACK SCANNING USING ANY ONE OF A PLURALITY OF NUMBER OF CONCURRENTLY ACCESSED TRACKS

FIELD OF THE INVENTION

The present invention relates to magnetic tape data storage particularly magnetic tape having a plurality of spaced apart servo track areas and capable of having a diverse number of concurrently accessed data tracks.

BACKGROUND OF THE INVENTION

Recording data or other information-bearing signals on magnetic tape has been practiced for many years. Some of the track formats on magnetic tape facilitate a so-called serpentine scanning of the tape such that the logical beginning and end of the magnetic tape are at the same physical end of the tape. In a preferred form of the invention, it is desired to employ serpentine scanning of data tracks while providing a close control of head-to-tape lateral positioning.

Such control of head-to-tape lateral positioning is best achieved by servoing the head position laterally to the tape. It is also desired, particularly in view of possible high error rates in magnetic tape, to provide a reliable set of servo tracks on a magnetic tape. In combination with the last-mentioned desire, it is also desired to control costs by making the head as low cost as possible. Such desire can be achieved using the present invention by placement and selection of servo track areas on the tape.

Most magnetic tape systems employ heads that are capable of scanning a fixed number of data tracks on a tape. Using the number of gaps in the head and the number of tracks on the tape are fixed with respect to each other. It is desired to provide a tape format and head construction that enables varying the number of active gaps in a head while using the same format on the tape. It is also desired to have servo track areas that are amenable to such variation in the number of tracks to be concurrently accessed.

An important aspect of magnetic tape recording is the ever increasing areal data storage density. It is desired to provide servo track areas that tend to minimize reduction of the data storage capacity of a magnetic tape through the introduction of servo position signals into the tape.

It is also desired to provide servo tracks that can be recorded by a tape device in the field, i.e. in situ.

DISCUSSION OF THE PRIOR ART

Most prior art magnetic tapes having longitudinally extending tracks do not employ servo tracks on the tape. While the so-called slant track tapes, video for example, employ servo tracks, such servo tracks are for synchronizing a rotating head to the tape motion and slant track position. As seen in U.S. Pat. No. 4,224,643 by Nakano et al and in U.S. Pat. No. 4,760,475 by Wong et al, the servo tracks are at the longitudinal edges of the video tape for synchronizing a rotary head assembly while scanning so-called slant tracks.

In contrast to video recording, most data storing tapes have longitudinally scanned tracks. U.S. Pat. No. 4,639,796 by Solhjell shows positioning a head assembly laterally of the tape for longitudinally scanning different data tracks by optically sensing the longitudinal edges of the tapes. Such tape-edge sensing does not provide the desired accuracy needed for the latest higher track densities.

Serpentine scanned longitudinal data tracks are shown in U.S. Pat. No. 5,196,969 by Iwamatsu et al. Such serpentine scanning is achieved by alternating write and read gap arrangements as also shown in U.S. Pat. No. 5,161,299 by Dennison et al. Tape drives have also used so-called sector servoing, i.e. position indicating signals are longitudinally interspersed with data signals. U.S. Pat. No. 4,472,750 by Klumpp et al shows such an arrangement. Longitudinally continuous position indicating signals are desired for accuracy and redundancy of the position indicating signals is desired for reliability.

A single servo track control for magnetic tapes is disclosed by Youngquist in U.S. Pat. No. 4,008,765. A specially constructed magnetic head with an asymmetrical gap arrangement enables using data gaps for sensing the single servo track to achieve different lateral positions on the tape. Such a single longitudinally-extending servo track, even though placed at the lateral midpoint of a tape, does not provide a desired degree of reliability for high track densities.

A QUARTER-INCH TAPE CARTRIDGE {QIC} proposed DEVELOPMENT STANDARD (Jun. 4, 1992), distributed by 3M Company, 311 E Carrillo ST, Santa Barbara, Calif. 93101, shows a tape format having longitudinally scanned tracks with two latterly spaced-apart servo areas. Appendix A of this document has FIG. A.1 showing the format. The format includes two independent servo track areas at respective quarter points laterally of the tape. Each servo track area has twelve servo tracks shown in FIG. A.2. Each servo track area is used independently for servoing a head (not shown in the standard) for accessing data tracks disposed laterally close thereto. Appendix A shows four sets of data tracks. Two sets of the data tracks are disposed laterally adjacent respective ones of the servo track areas. A substantial guard area extends longitudinally along the lateral midpoint of the tape. Therefore, it is clear that the first and second servo track areas are used to independently to servo position a head (not shown in the document) for the respective sets of tracks.

A multi-gap head useful for serpentine scanning of data tracks is shown in U.S. Pat. No. 5,161,299 by Dennison et al. This patent shows interleaved sets of read and write gaps for scanning the tape in opposite directions of tape movement, i.e. a two-direction scanning head. This patent shows a head construction useful for one-half inch wide magnetic tape that is guided past all of the head gaps. In accordance with the present invention, servo gaps are positioned in a two-direction scanning head for concurrently recording in a plurality of data tracks on the magnetic tape and which enables a tape device to servo the head relative to the tape for achieving the above-stated desires for enhancing magnetic tape storage of data and other information-bearing signals.

SUMMARY OF THE INVENTION

An object of the present invention is to provide an optimal and reliable servo positioning format for a magnetic tape that enables a tape device to concurrently access a selected number of data tracks.

This invention created a new servo and track format for magnetic tape plus devices and methods for using such created servo and track format. Both servo and data tracks have an optimal lateral spacing for reducing magnetic tape defect caused errors. A given plurality of longitudinally-extending servo track areas are evenly laterally spaced apart for creating said given plurality plus one of data track areas, each data track area having a like number and pattern of data tracks. Guard areas of no recording separate each data track area from a laterally adjacent one of the servo track areas as well as from each longitudinal edge of the tape. Each of the servo track areas has two servo positioning characteristics that are writable either in a factory by a servo writer or by a magnetic tape device used to record signals on the tape. Such a pattern enables users to degauss the tape for erasing that also erases the servo tracks. Then the tape devices can be used to rewrite the servo tracks.

It is preferred that the given plurality of servo track areas be three with four data track areas. The data tracks are arranged in clusters and groups. Each group of tracks contain so-called concurrently accessible tracks, i.e. store signals of one file, block, picture and the like. Each such group has tracks that are spaced apart laterally a number of tracks equal to the number of groups. Each cluster of tracks contain a number of tracks equal to the number of groups. All tracks in a cluster are recorded in the same direction and each track in the cluster is from a different one of the groups of tracks. Laterally adjacent track clusters are recorded in opposite directions of relative movement of the head and magnetic tape.

The format enables using magnetic recording/reading heads having diverse multi-track gap arrangements. The number of data gaps in the diverse heads vary by $2^N$ where N is a positive integer. The number of servo gaps for reading respective servo track areas vary inversely by $2^N$ to the number of tracks each of the magnetic heads used for recording and reading signals to and from the magnetic tape. The magnetic head having a maximum number of data gaps simultaneously or concurrently records and reads all of the tracks in the respective track groups. The magnetic heads having fewer data gaps require a plurality of tape passes to read all of the tracks in each track group. The plurality of tape passes increases by $2^N$ as the number of data gaps decrease by such number.

The foregoing and other objects, features and advantages of the invention will be apparent from the following more particular description of preferred embodiments of the invention, as illustrated in the accompanying drawings.

DETAILED DESCRIPTION

Figure 1:
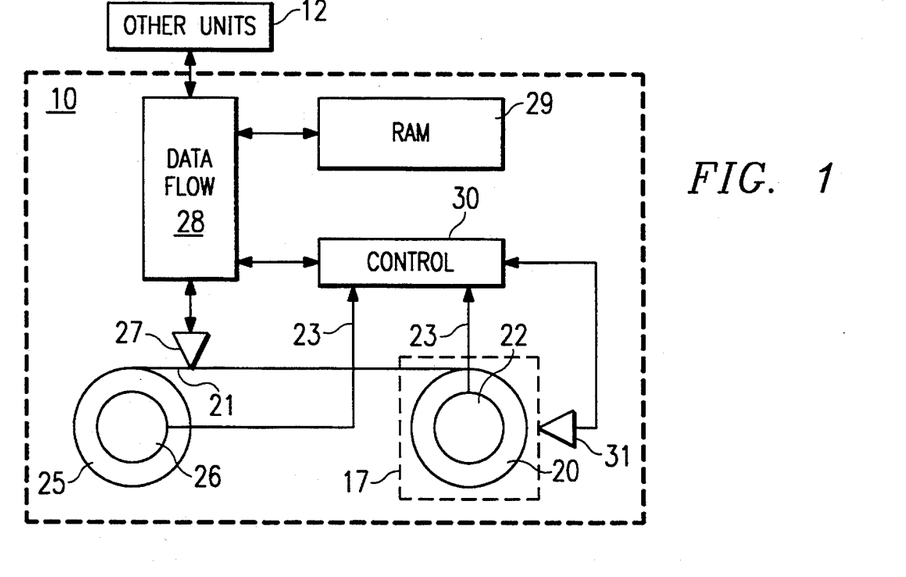
FIG. 1 illustrates, in a simplified block diagram, a tape device employing the present invention.
Figure 2:
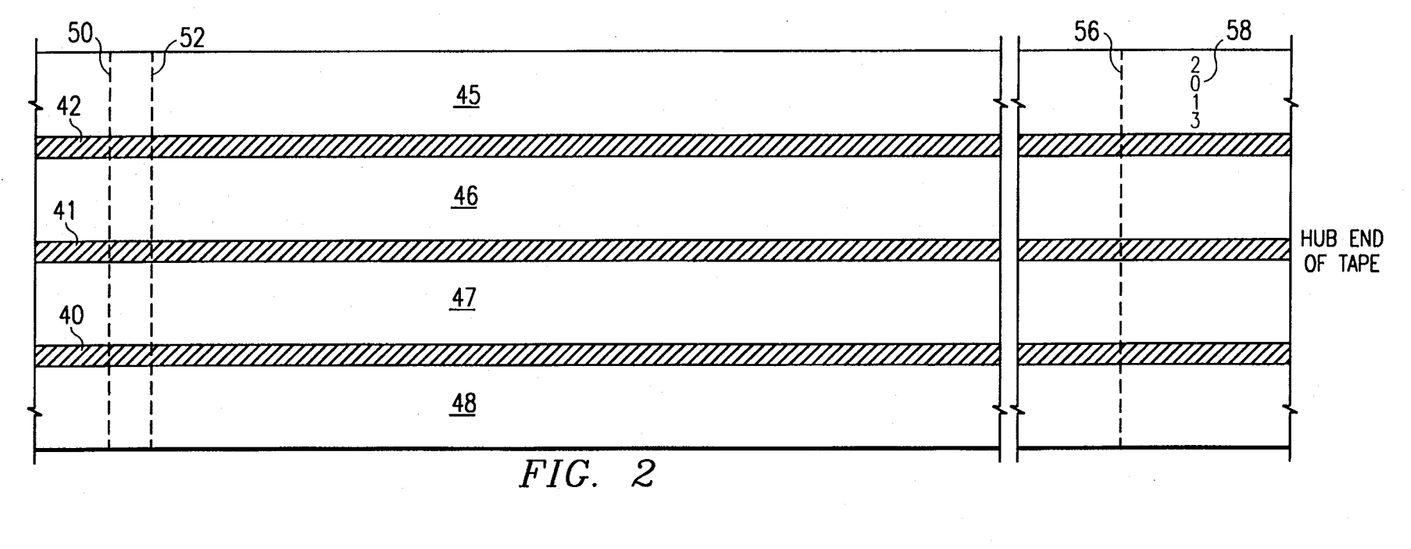
FIG. 2 diagrammatically illustrates a magnetic tape usable in the FIG. 1 illustrated device and that incorporates a preferred form of the present invention.

Referring now more particularly to the appended drawing, like numerals indicate like parts and structural features in the various figures. Referring first to FIG. 1, a tape drive 10 is connected (attached) to other units 12. Other units 12 represent peripheral controllers, computers of all types, communication systems, local networks and the like. In a constructed embodiment, a tape cartridge 17 containing a single spool 20 of magnetic tape 21 is removably inserted into tape drive 10. Tape cartridge 17 shown in a play position operatively connects a spool motor and tachometer 22 to tape spool 20 for unreeling and reeling tape 21. Tape 21 is automatically threaded (in a known manner) past laterally-positionable multi-track multi-gap head 27 to machine reel 25. Data are transferred between tape 21 and other units 12 via data flow 28. Data flow 28 performs the usual formatting, error detecting and correcting, and other processing of information-bearing signals (data) found in magnetic tape recording apparatus. Motor and tachometer 26 rotate spool 26 in synchronism with spool 20, as is known. Lines 23 denote control and sensing signal transfer between motors 22 and 26 with tape device control 30. Control 30 includes the usual programmed control for controlling data flow 28 and communicating with other units 12. Cartridge present sensor 31 senses the cartridge 17 for informing control 30 that cartridge 17 has been loaded into tape drive 10.

Referring next to FIGS. 2 through 6, the tape format, one head gap arrangement and servo control are described. Tape 21 includes triple longitudinally-extending laterally-spaced-apart redundant servo areas 40–42. At a free end of tape 21 (to the left in FIG. 2), a device to tape calibration area is disposed between dashed lines 50 and 52. This area contains signals (not described) that enable tape drive 10 to calibrate its operation to the particular characteristics of the loaded tape 21. The tape area between dashed line 52 and a hub end of tape 21 is available for recording as will become apparent. Numeral 58 denotes the four track groups 0–3 used in the constructed embodiment. Serial recording proceeds from track group 0 through track group 3, no limitation thereto intended. The first track group 0 is laterally displaced from longitudinal edges 56 and 57 respectively by tracks in track groups 2 and 1,3. Since track group 0 is a logical beginning of data recording, control information useful to either other units 12 or tape drive 10 may be first recorded in track group 0. Tape drive 10 has the usual load point controls for positioning magnetic tape and magnetic head 27 to first read the tracks in track group 0.

Figure 3:
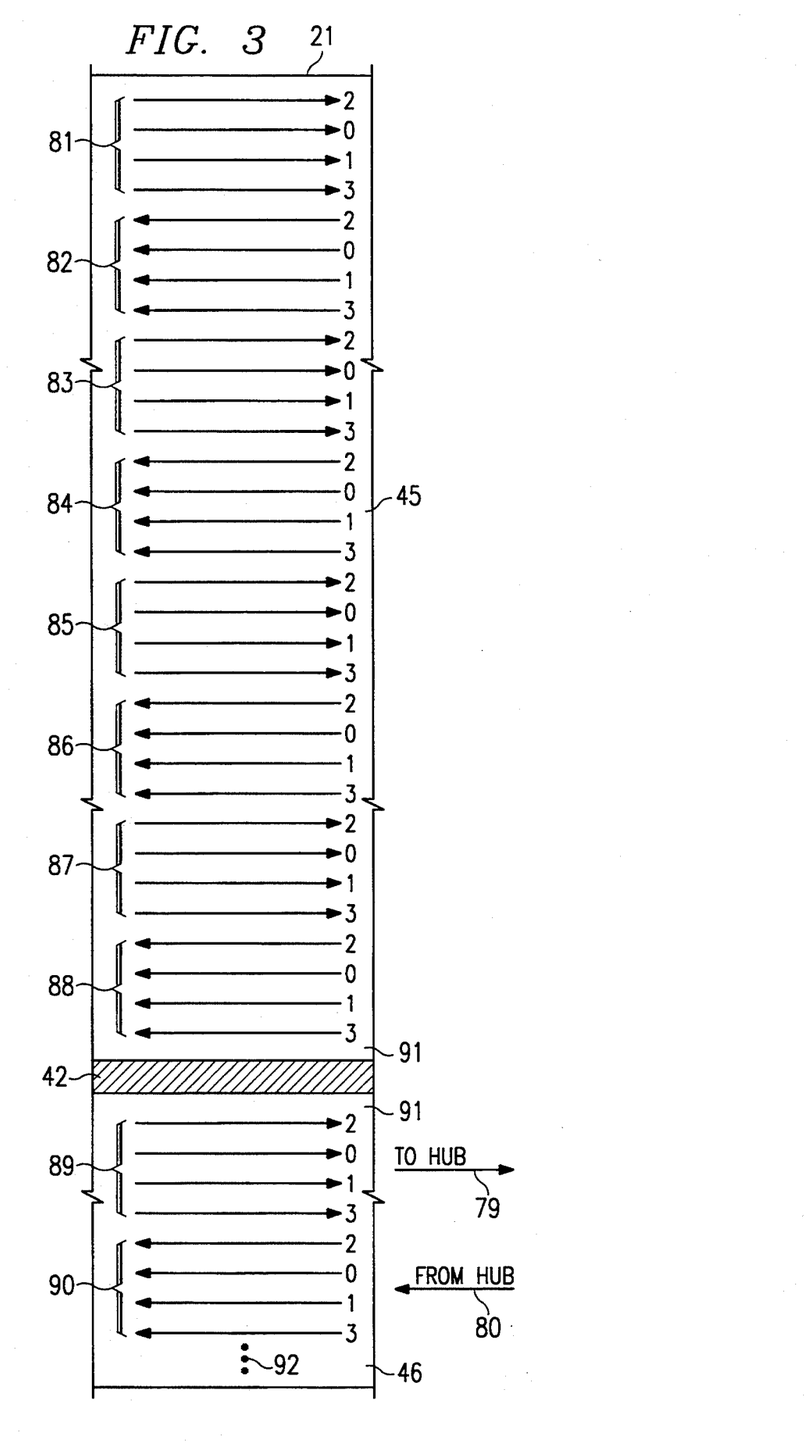
FIG. 3 diagrammatically illustrates a serpentine track arrangement for the FIG. 2 illustrated tape.

FIG. 3 diagrammatically illustrates obtaining a maximal spacing between adjacent tracks in each track group 0–3. Numerals 81–90 respectively indicate track clusters 1–10, each track cluster having one track from each track group. The data tracks in all data track areas 46–48 are arranged as shown in the illustrated track clusters. Laterally adjacent track clusters have tracks scanned in opposite scanning directions 79 and 80. Magnetic tape 21 moves in a direction opposite to the track scanning direction by magnetic head 27. The "to hub" scanning direction is caused by magnetic tape 21 being reeled from cartridge spool 20 while the "from hub" scanning direction is caused by magnetic tape being reeled onto cartridge spool 20. Magnetic tape 21 is scanned in a serpentine sequence. While magnetic head 27 is at one lateral (index) position, one serpentine scan (also termed a track wrap) occurs. In scan direction 79 one track in each of the odd numbered clusters are scanned while in scan direction 80 one track in each of the even numbered track clusters are scanned. The arrows in the respective track clusters 81–90 (numbered as clusters 1–10) indicate the tracks. Each vertical number sequence "3 0 1 2" in each of the track clusters 81–90, for example, respectively indicate the track group to which the respective track belongs. The track number of the arrow indicated tracks in each of the clusters is determined by the following equations wherein K is the cluster number from 1–32:

Track number of track group 2 track $= (K*4) - 3$      (1)

Track number of track group 0 track $= (K*4) - 2$      (2)

Track number of track group 1 track $= (K*4) - 1$      (3)

Track number of track group 3 track $= (K*4)$      (4)

All of the tracks are evenly spaced apart laterally. The concurrently accessed tracks of each track group are spaced apart by seven intervening tracks. For example, tracks 1 and 9, as determined by the equations above, are laterally separated by tracks 2 through 8. For having four groups of tracks, such lateral spacing is maximum for all tracks and is the same for all successively numbered tracks in each track group. Note that the tracks of track group 2 in the even numbered track clusters are not accessed concurrently to the track group 2 tracks in odd numbered clusters. Also, the four data track areas 45–48 (FIGS. 2 and 4) have a like number of tracks (each data track area having eight track clusters) such that the servo track areas 40–42 have a maximum lateral spacing. Such maximum lateral spacing is an optimum spacing for enhancing correction of errors caused by magnetic tape defects. A pair of unrecorded longitudinally-extending guard bands 91 separate the data track areas 45–48 from each of the servo track areas 40–42, respectively (see FIGS. 3 and 5).

Figure 4:
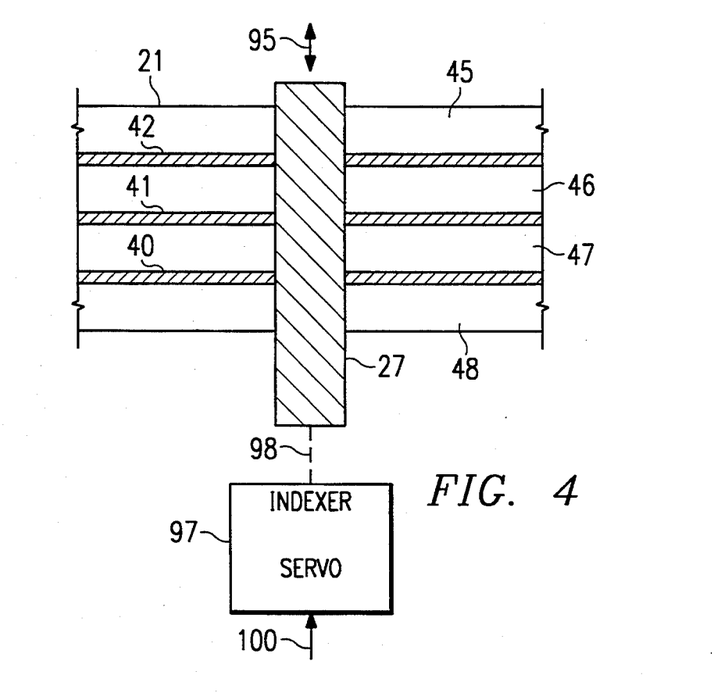
FIG. 4 diagrammatically illustrates a transducer employing the present invention that is indexed and servo-positioned with respect to a plurality of servo areas on a magnetic tape.

FIG. 4 shows indexing head 27 (head is detailed in FIG. 6) laterally of magnetic tape 21. Magnetic head 27 has three sets of servo gaps A, B and C that concurrently sense the respective servo track areas 40–42, respectively. The sensed servo signals are processed as later described with respect to FIGS. 7 and 8 to generate a servo drive signal on line 100 for actuating servo 97, mounted on a frame (not shown) to move head 27 to follow the servo tracks. Numeral 98 indicates the physical connection of servo 97 to head 27. Also included in servo 97 is an electronic circuit (not shown) that initially indexes head 27 to position the servo gaps over the respective servo track areas 40–42 as best seen in FIGS. 4 and.

Figure 5:
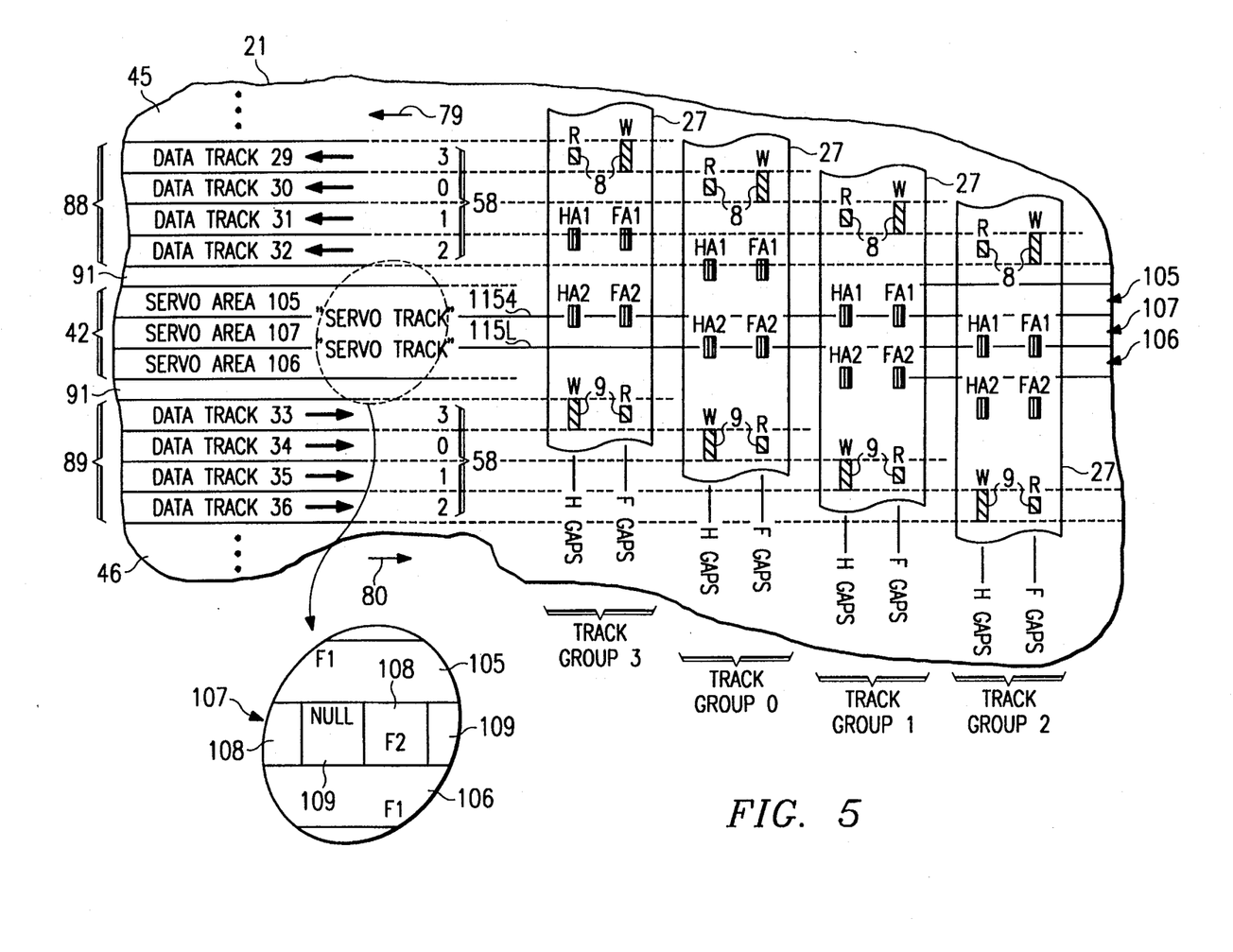
FIG. 5 is a greatly enlarged showing of one servo track area with servo gap positioning for effecting the head indexing shown in FIG. 4.

Servo track areas 40–42 are identical. Servo track area 42 disposed between data track areas 45 and 46 is detailed (FIG. 5). Between laterally spaced-apart guard bands 91, two longitudinally-extending frequency-F2 base-band tone areas 105 and 106 extend substantially the length of tape 21. A longitudinally-extending modulated servo area 107 is interleaved between tone areas 105 and 106. Area 107 has alternating sections 108 of frequency-F1 tone with sections 109 of null (all 0's signal in a data format, such as in a 1,7 d,k code) signal. F1 and F2 have a predetermined different frequency for effecting lateral position indication at the boundaries (servo tracks) 115U and 115L between the F1 and F2 frequency. The null sections 109 enable checking centering of an active servo gap scanning the respective servo tracks 115U and 115L. The illustrated servo positioning action will be described after the FIG. 6 head gap arrangement is next described.

Figure 6:
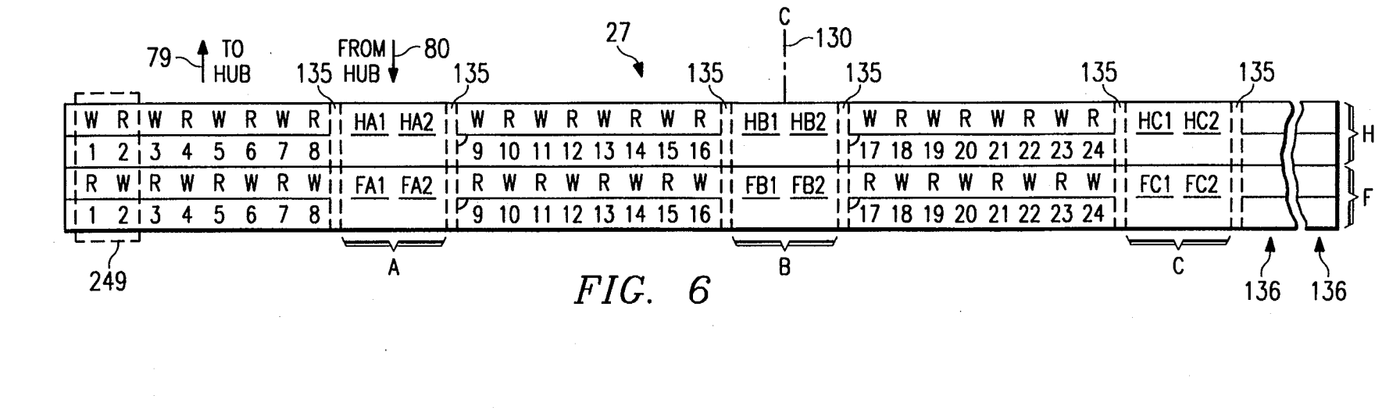
FIG. 6 is an enlarged diagrammatic showing of a preferred head gap pattern for practicing the present invention.

Magnetic head 27 has two portions F and H, each portion having interleaved write and read gaps. U.S. Pat. No. 5,161,299 (U.S. Pat. No. '299) shows an multigap multi-track head that does not have servo gaps. The head used in this invention is an improvement over the magnetic head shown in said patent U.S. Pat. No. '299. All of the odd numbered write gaps W in section H write data in scanning direction 79 while the even-numbered write gaps W in section F write data in scanning direction 80. The read after write verification is respectively effected by the odd-numbered and even-numbered read gaps R in the scanning directions 79 and 80. During read operations, read gaps R also read data from magnetic tape 21. Magnetic head 27 has 32 write gaps (16 in each head section) and 32 read gaps (16 in each head section). Therefore, magnetic head 27 concurrently reads or writes in 16 different tracks in one of the track groups 0–3.

Magnetic head 27 servo gaps are arranged into three sets, A, B and C respectively for scanning servo track areas 42–40. Each head section F and H has two servo gaps in each of the sets A–C. The servo gaps are respectively identified by a three digit code, a first digit (F or H) indicates the head section, a second digit (A–C) indicates which of the three sets has the identified servo gap and a third digit (1 or 2) indicates which of the two servo gaps in the respective head section is identified.

Figure 9:
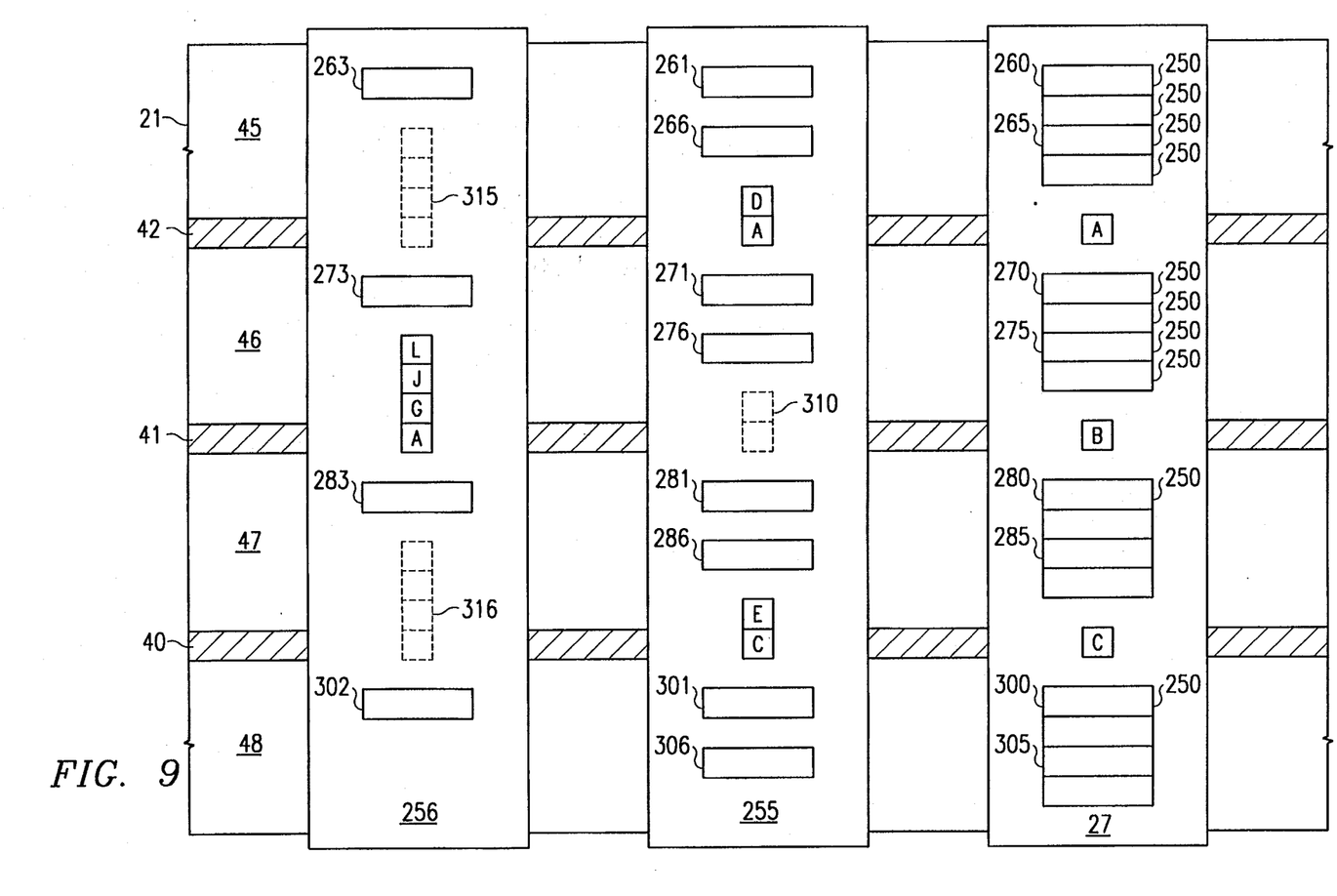
FIG. 9 diagrammatically shows a plurality of magnetic heads having diverse data and servo gap arrangements that can record and read a magnetic tape such as shown in FIG. 2.

The data gaps (W and R) are arranged in four head lateral areas corresponding to the data track areas 45–48 as best seen in FIG. 9. The odd numbered write gaps respectively concurrently record in one track of the odd numbered track clusters. That is, gap W1 records data in track cluster 1 (one of the tracks 1–4). gap W3 records in track cluster 3 (one of the tracks 9–13), etc. Similarly, even numbered write gaps record in even numbered track clusters. Head 27 is indexed to one of four positions for writing or reading from the tracks (respectively in track groups 0–3) as described above and as will become apparent from a later description of FIG. 5.

Numeral 130 denotes the symmetrical lateral center of head 27 inter-gap arrangement. Numeral 135 collectively indicates gap spaces for generating guard bands 91. Numeral 136 indicates gaps numbered 25–32 but not shown in FIG. 6.

Returning now to FIG. 5, the four head 27 index positions are described, one indexed head position for each of the four track groups 0–3. Servo gaps in gap set A illustrate the four-index positioning. Since servo gaps FA1 and FA2 are used to position in scanning direction 79 and servo gaps HA1 and HA2 are identically used in scanning direction 80, the gaps are generically identified as A1 and A2. For accessing tracks in track group 2 a maximal closeness to longitudinal edge 56 is desired. Therefore, right-most gap A2 (FIG. 6) is the active gap scanning the left-most (FIG. 4 upper) servo track 115. Tracks in track group 0 are next adjacent to the track group 2 such that servo gap A1 is centered on servo track 115U. Similarly, tracks in track group 1 are accessed by centering active servo gap A2 on servo track 115L. Track in track group 3 are accessed by centering gap A1 as an active gap on servo track 115L.

Head indexing (not described in detail) uses electronic circuits of known design to initially position head 27 in one of the four servo positions. The centered servo gap senses the servo pattern to enable automatically switching from the open loop indexing to servo track following, all as is known.

Figure 7:
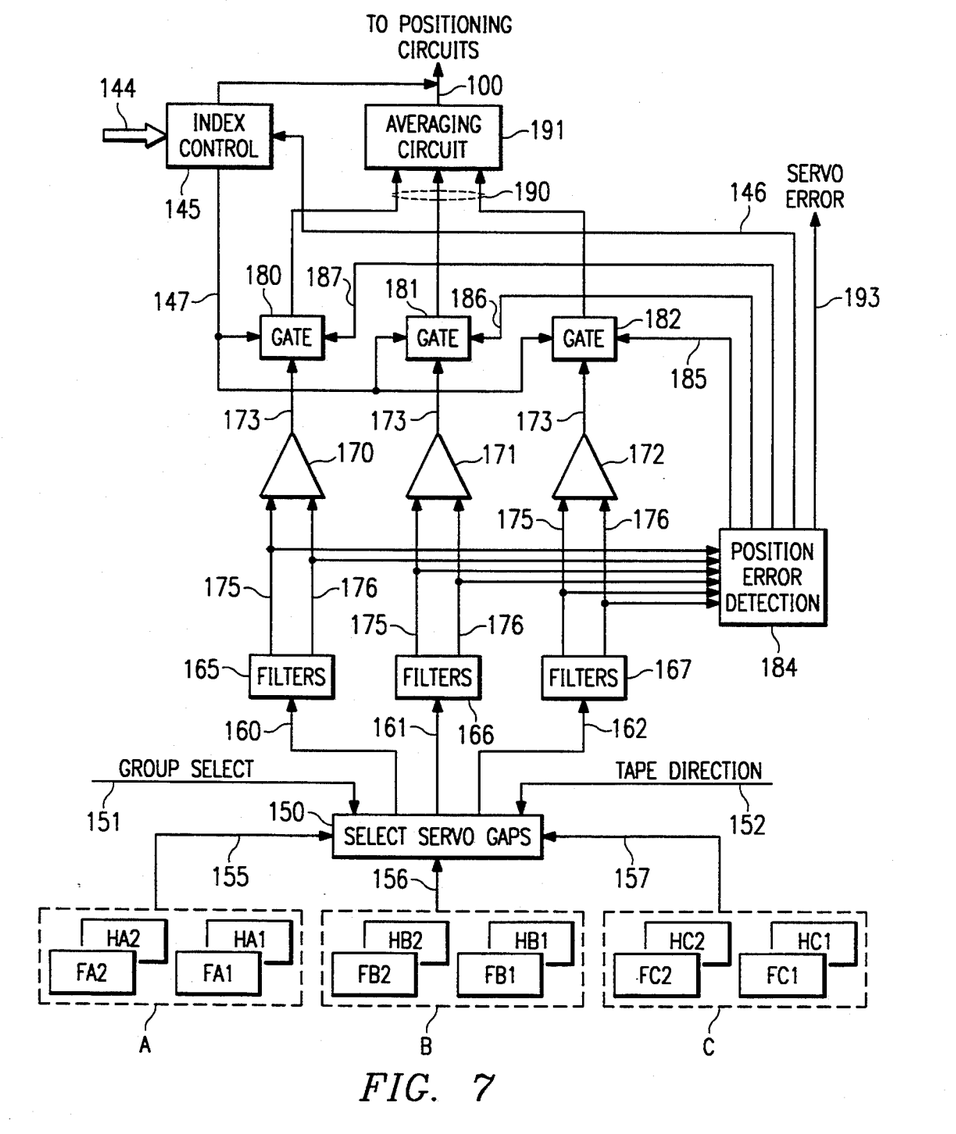
FIG. 7 is a simplified block diagram showing of selecting head servo gaps for selecting position error signals (PES) for practicing the present invention.
Figure 8:
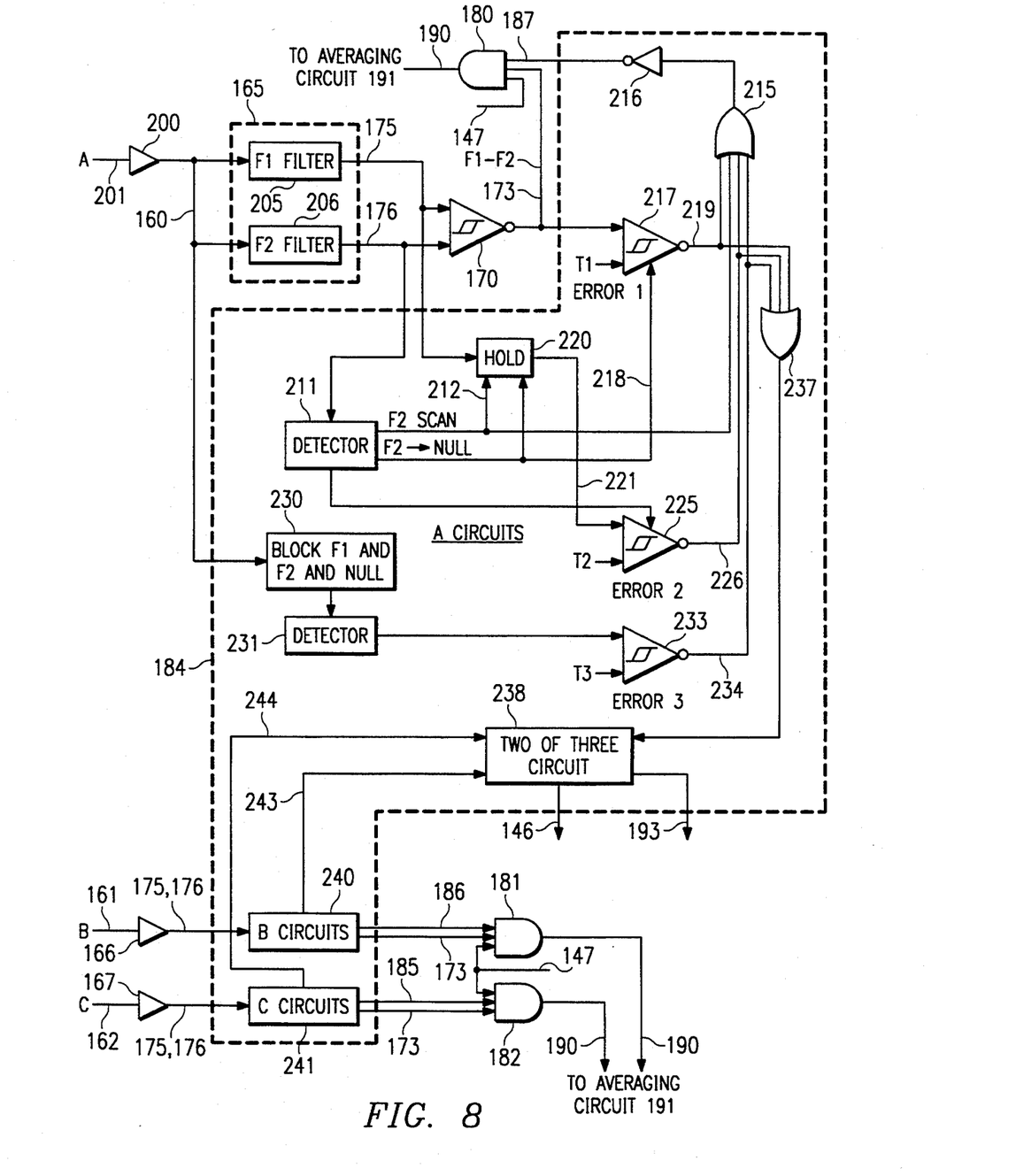
FIG. 8 is a simplified block diagram showing error detection and PES blocking based on PES excessive-error detection.

Servo gap selection and servoed track following is illustrated in abbreviated form in FIGS. 7 and 8. FIGS. 7 and 8 are a combination of electronic circuits and program implemented operations. That is, filters 165–167 can be conventional electronic filters that supply analog signals over lines 175 and 176 to amplitude comparators 170–172, respectively. In one embodiment, the output signals of filters 165–167 were digitized to digitally represent read back signal amplitudes. In this one embodiment averaging circuit 191, gates 180–182, etc, are program implemented. It is well within one of ordinary skill in this art to make such design choices for implementing the present invention.

First described in FIG. 7 is servo gap selection for effecting track following. Each servo gap set A, B and C has four servo gaps as described with respect to FIGS. 5 and 6. FIG. 5 illustrates which of the servo gaps in each set are selected for the respective concurrent track groups as indicated by control 30 over line 15' to select servo gap circuit 150. Servo gaps in head section F are used whenever tape is being reeled from cartridge spool 20 to machine spool 15 Servo gaps in head section H are used whenever the magnetic tape is being reeled from machine reel 25 to cartridge reel 20. Accordingly, select servo gaps circuit (can be partially program implemented) 150 responds to the group select signal on line 151 and the tape direction signal on line 152 to select one servo gap from each servo gap set A, B and C for supplying three independently read servo signals respectively over lines 160–162 to filter circuits 165–167. Filter circuits 165–167 each separately filter the F1 and F2 signals read from the respective servo track areas 42–40. Lines 175 respectively carry the F1 filtered signals while lines 176 respectively carry the F2 filtered signals. Amplitude comparators 170–172 respectively amplitude compare (such as by either analog or digital subtraction of one of the signal amplitudes from another signal amplitude to supply respective differential servo position error indicating signals over the respective lines 173 to gates 180–182. Gates 180–182 respond to position error detection circuit 184 to pass the respective position error signals while circuit 184 indicates respectively over lines 187–185 satisfactory signal quality has occurred while reading the servo signals from tape 21 respective servo track areas. Gates 180–182 passed servo position error signals all proceed over respective lines 190 to averaging circuit 191. For writing data onto tape 21 two of the three position error signals must be valid. If only one such signal is valid during writing, then position error detection circuit 184 supplies a servo in error signal over line 193 that effects aborting writing data. For reading data, only one of the servo position error signals may be used for a successful read. Other read controls may be implemented, as well, but are not described herein.

Acquisition of track following for any of the four concurrent track groups includes open-loop indexing or stepping magnetic head 27 under control of index control 145. Control 30 supplies lateral position information over cable (can be a program path) 144 to control 145. Control 145 supplies an appropriate control signal over line 100 to actuate the FIG. 4 illustrated head 27 positioning servo/indexer 97. As the active servo gaps begin scanning the respective servo track areas 40–42 position error signals are being generated. Index control 145 responds to position error detection circuit 184 supplying an indication over line 146 that servo position error signals are being generated and to a control 145 internal indication (not shown) that the indexing operation has caused the active servo gap to reach the desired servo track 115U or 115L to supply a gate enabling signal (can be a program signal) over line 147 to actuate gates 180–182 to pass the respective lines 173 signals conditioned on the value of the respective signals on lines 187–185.

FIG. 8 illustrates, in simplified form, operation of circuit 184. Numerals 201 and 202 represent reading the servo track area 42 (via an active gap of the A servo gap set) and amplification of the sensed servo signal. Filters 165 include an F1 signal passing through filter 205 to supply F1 over line 175 while F2 signal passing through filter 206 to supply F2 over line 176. The amplitudes of the F1 and F2 signals on lines 175 and 176 indicate servo position error. Amplitude comparator 170 generates the position error signal "F1–F2" traveling over line 173 to AND circuit or gate 180. The line 187 control signal opens gate 180 when no error conditions in the A circuit portion of circuit 184 indicate poor sensed signal quality or an unintended off-track condition. Three such errors 1–3 are described. Error 1 occurs if the F1–F2 signal has too high an amplitude for indicating that the servo gap is favoring sensing the F1 portion 105 or 106 (FIG. 5). Amplitude comparator 217 compares F1–F2 with amplitude threshold T1. Error 1 is indicated if F1>F2 more than T1. F1 can also be compared to a threshold amplitude during the null periods when the servo gap is scanning an F1 area and a null area 109. Comparator 217 is activated by detector 211 responding to the transition from an F2 area 108 to a null area 109 to supply a timing signal over line 218 for actuating comparator 217 to output a new value and hold it until the next F1 to null transition.

Error 2 indicates that F1 amplitude value changes beyond a predetermined maximum value during the periods that an area F2 is being scanned as indicated by threshold signal T2. The F1 signal amplitude value is captured and held in hold circuit 220 (determination of error 2 is program implemented in one embodiment). Line 175 connects to one input of hold circuit 220. Hold circuit 220 is enabled to receive and store the F1 signal while an F2 area 108 is being scanned. Detector 221 detects and indicates an F2 signal and supplies an actuating signal over line 212 to hold circuit to receive F1 signal. Detector 211 detects and indicates on line 218 each transition from an F2 area 108 to a null area 109 for actuating hold circuit 220 to supply the captured F1 signal over line 221 to error 2 detecting amplitude comparator 225. At this time the line 212 F2 scan-indicating signal is removed for disabling circuit 220 from receiving the F2 signal. Comparator 225 compares the line 221 captured F1 signal with threshold T2. When the captured F1 signal has a greater amplitude than T2, an unintended servo offset is indicated. Therefore, comparator 225 then emits an error 2 signal over line 226.

Error 3 signal indicates excessive noise is being sensed from the servo track area being scanned. The line 160 signal enters blocking or comb filter 230 for blocking the F1, F2 and any null signal (such as all 0's indicated by a d,k coded signal) for passing noise signals to amplitude detector 231. Detector 231 supplies a noise amplitude indicating signal to error 3 amplitude comparator 233. Comparator 233 compares the detector 231 supplied signal with a third amplitude threshold T3. If the noise indicating signal exceeds T3, then comparator 233 supplies an error 3 indicating signal over line 234.

Other types of errors can also be detected, such as limiting a change in F1-F2 successive signals, amplitude of F2, etc.

The line 187 AND gate conditioning signal is generated by OR circuit 215 supplying an actuating signal to invertor 216. When all of the input signals to OR circuit are inactive, then invertor 216 actuates AND gate 180 to pass the line 173 F1-F2 servo position error signal. When none of the error comparators 217,225 and 233 are not detecting an error condition and the F2 scan signal on line 212 is active, then there is an inactive output signal from OR circuit 215 for actuating AND gate 180. While any one of the error comparators 217, 225 or 233 is supplying an error signal or the F2 scan signal on line 212 is inactive, then AND gate 180 closes to block the line 173 signal from passing to averaging circuit 191.

The above description relates to an so-called "A circuit" in circuit 184 that processes sensed servo signals from the A set of servo gaps. Similarly, B circuit 240 and C circuit 241 respectively operate as described for the A circuit. AND gates 181 and 182 are controlled by B and C circuits, respectively, as described for the A circuit. The sensed servo signal inputs to the B and C circuits are respectively carried over lines 161 and 162 through circuits 166 and 167 (filters) to lines collectively indicated by numerals 175,176 in FIG. 8.

The line 193 servo turn off signal is generated by two-of-three circuit 238 responding to two of the three circuits A, B and C indicating one of three errors 1, 2 or 3. In A circuit, OR gate 237 receives the output signals from error comparators 217, 225 and 233. Any one of the lines 219, 226 or 234 carrying an error indicating signal passes through OR gate 237 to supply an A circuit error indicating signal to circuit 238. Similarly, B and C circuits respectively supply B and C circuit error indicating signals over lines 243 and 244 to two-of-three circuit 238. Circuit 238 consists of logic elements using known designs to indicate on line 193 that two of the three servo signals are in an error condition. Remember, that two such error conditions cause any data writing to be aborted. Line 146 carries a signal that is the inverse of the line 193 signal for indicating that at least two of the three sensed servo signals are valid.

FIG. 9 diagrammatically illustrates using any one of diverse heads for accessing the data tracks of magnetic tape 21 using the illustrated servo track areas. Magnetic head 27 concurrently accesses 16 tracks. In FIG. 9, numeral 250 collectively denominates data gap sets, each set having four data gaps, two write gaps and two read gaps. Referring to FIG. 6, numeral 249 denotes a dashed line box enclosed data gap set 260. Set 260 consists of write gaps W1 and W2 plus read gaps R1 and R2. That is each data gap set has an odd numbered write gap and an even numbered write gap for writing data in reverse directions. Other data gap sets are identified in FIG. 6 by a set of odd and even numbered read and write gaps.

Eight concurrent track accessing head 255 has eight data track sets, each data track set having a lateral alignment of one of the data track sets of head 27. Similarly, four concurrent track-accessing head 256 has four data track sets respectively aligned with respective data track sets of head 27. The table below indicates the data track set alignment indicated in FIG. 9.

TABLE I

| HEAD 27 DATA TRACK SET | HEAD 255 DATA TRACK SET | HEAD 256 DATA TRACK SET |
| --- | --- | --- |
| 260 | 261 | 263 |
| 265 | 266 | NONE |
| 270 | 271 | 273 |
| 275 | 276 | NONE |
| 280 | 281 | 283 |
| 285 | 286 | NONE |
| 300 | 301 | 302 |
| 305 | 306 | NONE |

Table I rows indicate aligned data track gap sets. For reading or writing a same block of data to or from magnetic tape 1, head 27 writes and reads the block in one pass, magnetic head 55 requires two passes and head 256 requires four passes.

Each magnetic head has a different number of the servo gap sets. The servo gap sets are best seen for magnetic head 27 in FIG. 6 as sets A, B and C. Magnetic head 255 has four servo gap sets. For sensing the servo tracks in servo track area 42, servo gap sets A and D are used to obtain eight index positions of head 255, i.e. twice the number of head 27 index position. Similarly servo gap sets C and E sense servo track area 40 for obtain the same eight index positions of head 255. Numeral 310 identifies dashed line illustrated servo gap positions of head 255 for indicating that the servo track area 41 is not used. This election is to reduce the cost of manufacture of head 255. Since magnetic head 255 has only eight sets of data gaps, the cost of having triple servo redundancy is dispensed with, no limitation thereto is intended.

Four track set head 256 has only four servo gap sets A, G J and L all for sensing servo track area 41. Dashed line servo gap positions 315 and 316 are dispensed with for cost reasons, no limitation thereto is intended.

While the invention has been particularly shown and described with reference to preferred embodiments thereof, it will be understood by those skilled in the art that various changes in form and details may be made therein without departing from the spirit and scope of the invention.

What is claimed is:

1. An elongated flexible magnetic tape record member having a magnetic coating for receiving and storing signals, a pair of longitudinal edges, a lateral direction of said magnetic tape being transverse to said longitudinal edges, the improvement including, in combination:

a predetermined plurality of N laterally spaced-apart longitudinally-extending servo areas having longitudinally-extending servo tracks that extend substantially a length of said magnetic tape, N is a positive integer greater than unity, said tape having N+1 longitudinally extending data track areas being laterally interleaved with said N longitudinally-extending servo areas;

each of said longitudinally-extending servo areas having an identical number of laterally-displaced signals in said servo tracks, said laterally-displaced signals in each of said servo tracks indicating a respective predetermined identical plurality of relative lateral positions on said tape; and said data track areas respectively being laterally spaced-apart between laterally-adjacent ones of said longitudinally-extending servo areas, said data track areas having a like lateral extent for having a same number of data tracks in each of said data track areas respectively located at said indicated lateral positions.

2. The magnetic tape set forth in claim 1, further including, in combination:

N being an odd number greater than unity;

a first one of said longitudinally-extending servo areas extending longitudinally along a predetermined lateral midpoint between said longitudinal edges;

second ones of said longitudinally-extending servo areas other than said first one longitudinally-extending servo area being disposed at predetermined lateral positions between said first one longitudinally-extending servo area and said longitudinal edges, respectively, an equal number of said second ones of said longitudinally-extending servo areas being disposed between each of said longitudinal edges and said first one longitudinally-extending servo area.

3. The magnetic tape set forth in claim 2 wherein N is equal to three; and said second longitudinally-extending servo areas consisting of two of said second longitudinally-extending servo areas spaced between said first one longitudinally-extending servo area and a respective one of said longitudinal edges to create four data track areas having equal lateral dimensions.

4. The magnetic tape set forth in claim 2 wherein each of said longitudinally-extending servo areas has two of said longitudinally-extending servo tracks laterally separated by a distance substantially equal to a lateral extent of each of said data tracks.

5. The magnetic tape set forth in claim 1 wherein each of said longitudinally-extending servo areas has two of said longitudinally-extending servo tracks laterally separated by a distance substantially equal to a lateral extent of each of said data tracks.

6. The magnetic tape set forth in claim 1 wherein a number of said data tracks in each of said data track areas is equal to an integral multiple of N+1.

7. A method of controlling a lateral position of a multi-gap multi-track head with respect to a magnetic tape, said magnetic tape being flexible with a magnetic coating and having first and second longitudinally extending edges, including the steps:

providing on said magnetic tape N laterally spaced-apart longitudinally-extending servo areas that extend substantially a length of said magnetic tape;

making N a positive integer greater than unity such that said tape has N+1 longitudinally extending data track areas laterally interleaved with said N longitudinally-extending servo areas;

in each of said longitudinally-extending servo areas providing recorded servo signals for indicating a respective predetermined plurality of lateral positions on said magnetic tape;

making said data track areas respectively being lateral spaced between laterally-adjacent ones of said longitudinally-extending servo areas, making said data track areas to have a like lateral extent for having a same number of data tracks in each of said data track areas;

loading said magnetic tape into a tape drive for recording and reading signals;

moving a laterally-movable multi-gap multi-track head into a predetermined transducing relationship to said magnetic tape;

in the head, providing a plurality of sets of servo gaps in a lateral spaced-apart relationship and being spaced a lateral distance equal to said spaces between said servo track areas on said magnetic tape, said lateral spaced-apart relationship being identical in each said set of servo gaps;

selecting one of said servo gaps in each of said sets having a same relative lateral position in said sets; and sensing said servo track areas via said selected servo gaps for laterally position controlling said head relative to said magnetic tape.

8. The method set forth in claim 7, including the steps;

selecting said N to be an odd number greater than unity;

laterally positioning a first one of said longitudinally-extending servo areas extending longitudinally along a predetermined lateral midpoint between said longitudinal edges;

laterally positioning second ones of said longitudinally-extending servo areas other than said first one longitudinally-extending servo area being disposed at predetermined lateral positions between said first one longitudinally-extending servo area and said longitudinal edges, an equal number of said second ones of said longitudinally-extending servo areas being disposed between each of said longitudinal edges and said first one longitudinally-extending servo area.

9. The method set forth in claim 8, including the steps:

selecting said N to be three; and creating and equally laterally spacing apart said second longitudinally-extending servo areas to consist of two of said second longitudinally-extending servo areas spaced between said first one longitudinally-extending servo area and a respective one of said longitudinal edges to create four data track areas having equal lateral dimensions.

10. The method set forth in claim 9, including the steps:

in each of said longitudinally-extending servo areas creating two longitudinally-extending lateral servo position indications to be laterally separated by a distance substantiality equal to a lateral extent of each of said data tracks.

11. The method set forth in claim 7, wherein each of said data tracks are to have a predetermined lateral extent, including the steps:

in each of said longitudinally-extending servo areas creating two longitudinally-extending servo position indications laterally separated by a distance substantially equal to said lateral extent of each of said data tracks.

12. The method set forth in claim 1, including the steps of:

creating each said data storage area to have an integral multiple of N+1 data tracks; and creating an laterally disposing between each of said data track areas and a laterally adjacent one of said servo track areas a longitudinal-extending non-recorded guard band.

13. A magnetic tape drive having means for transporting a magnetic tape between first and second tape reels past a transducing station in the tape drive, said tape and a multi-gap multi-track head mounted in the tape drive in said transducing station for relative lateral movements for enabling said head to concurrently access data tracks on the magnetic tape in each of a predetermined number of groups of laterally spaced-apart ones said data tracks, an improvement including, in combination:

said magnetic tape having a magnetic coating for receiving and storing signals, a pair of longitudinal extending edges, a lateral direction of said magnetic tape being transverse to said longitudinal edges;

N laterally spaced-apart longitudinally-extending servo areas recorded in said magnetic coating that extend substantially a length of said magnetic tape, N is a positive integer greater than unity, said tape having N+1 longitudinally-extending data track areas being laterally interleaved with said N longitudinally-extending servo areas;

each of said longitudinally-extending servo areas having signals indicating a respective predetermined plurality of lateral positions;

said data track areas respectively being laterally spaced between laterally-adjacent ones of said longitudinally-extending servo areas, said data track areas having a like lateral extent for having a same number of data tracks in each of said data track areas; and servo means connected to the head and said tape for simultaneously sensing all of said longitudinally-extending servo areas for generating a servo drive for relatively laterally positioning the head and the tape to a predetermined relative lateral position with respect to said longitudinally-extending servo areas.

14. The apparatus set forth in claim 13, further including, in combination:

said servo means having redundancy sensing means for detecting that less than all of said servo gaps are supplying an acceptable servo signal;

said redundancy means having a signal quality means connected to said head for receiving signals read by said servo means from each of said servo areas; and said signal quality means evaluating the read back signal quality of all said read back servo signals and being responsive to an evaluated read back quality of a predetermined number of said read back servo signals that are not acceptable to inhibit writing data onto said magnetic tape, said predetermined number being greater than one.

15. The apparatus set forth in claim 13, including:

said N being an odd number greater than unity;

on said magnetic tape a first one of said longitudinally-extending servo areas extending longitudinally along a predetermined lateral midpoint between said longitudinal edges;

said head having a set of servo gaps for scanning said servo areas to sense servo signals recorded therein, respectively;

second ones of said longitudinally-extending servo areas other than said first one longitudinally-extending servo area being disposed at predetermined lateral positions between said first one longitudinally-extending servo area and said longitudinal edges, an equal number of said second ones of said longitudinally-extending servo areas being disposed between each of said longitudinal edges and said first one longitudinally-extending servo area; and said servo means connected to said servo gaps for simultaneously sensing all of said longitudinally-extending servo areas for developing a plurality of servo drive signals, combining means in the servo means for combining all of said servo drive signals to generate a single drive signal for positioning the head laterally of the magnetic tape to any one of a certain number of lateral relative positions of said head and magnetic tape.

16. The apparatus set forth in claim 15, further including:

each of said longitudinally-extending servo areas having two longitudinally/extending lateral servo position indications being laterally separated by a distance substantially equal to a lateral extent of each of said data tracks such that said longitudinally-extending servo areas are field writable;

said head having a plurality of servo gaps for sensing either one of said lateral servo-position indications; and said servo means having position selecting means for selecting a maximal number of lateral head positions with respect to the magnetic tape that is the product of said plurality of servo gaps times two.

17. The apparatus set forth in claim 16, further including:

said head having a given number of laterally spaced-apart data signal gaps for concurrently accessing predetermined number of said data tracks, said given and predetermined numbers being equal;

data flow means connected to said data signal gaps in said head for concurrently recording or reading said given number of said data tracks, all concurrently-accessed ones of said data tracks at each respective said lateral relative positions being a certain number of groups of said data tracks equal to a certain number;

said certain number being equal to said certain number of lateral relative positions; and said data tracks in each said group of data tracks being laterally spaced apart by said certain number less one of respective lateral intervening ones of said data tracks such that each said intervening one of said data tracks being in a different one of said groups of tracks.

18. The apparatus set forth in claim 17, further including:

tape means for receiving said magnetic tape and for indicating that said magnetic tape has been loaded into the magnetic tape drive;

said servo means having lead point means connected to said tape means for responding to said loading indication for actuating the head to initially position to one of said groups of data tracks that has at least one data track from another one of said groups of data tracks interposed between said one group data track and either one of said longitudinal tape edges such that a logical beginning of tape is established at a lead point of said one group of data tracks.

* * * * *

UNITED STATES PATENT AND TRADEMARK OFFICE
CERTIFICATE OF CORRECTION

PATENT NO. : 5,432,652
DATED : July 11, 1995
INVENTOR(S) : Comeaux, Graves and Johnson It is certified that error appears in the above-indentified patent and that said Letters Patent is hereby corrected as shown below:

At column 6, line 2, "and" should be -- and 5 --.

At column 10, line 33, "tape 1" should be -- tape 21 --.

At column 10, line 34, "55" should be -- 255 --.

At column 16, line 3, "lead" should be -- load --.

Signed and Sealed this

Third Day of October, 1995

*Attest:*

BRUCE LEHMAN

*Attesting Officer*  *Commissioner of Patents and Trademarks*